(12) United States Patent
Tiberghien et al.

(10) Patent No.: US 8,336,922 B2
(45) Date of Patent: Dec. 25, 2012

(54) CONNECTION ASSEMBLY AND METHOD OF CONNECTING SUCH AN ASSEMBLY

(75) Inventors: Alain-Christophe Tiberghien, Sevrier (FR); Philippe Guin, Annecy (FR)

(73) Assignee: Staubli Faverges, Faverges (FR)

( * ) Notice: Subject to any disclaimer, the term of this patent is extended or adjusted under 35 U.S.C. 154(b) by 615 days.

(21) Appl. No.: 12/458,093

(22) Filed: Jun. 30, 2009

(65) Prior Publication Data
US 2009/0322072 A1 Dec. 31, 2009

(30) Foreign Application Priority Data

Jun. 30, 2008 (FR) ...................................... 08 54391

(51) Int. Cl.
*F16L 39/00* (2006.01)
(52) U.S. Cl. ................... 285/124.3; 285/124.4; 285/920; 137/594
(58) Field of Classification Search .................... 285/920, 285/124.3, 124.4, 124.5; 137/594; 280/420, 280/421
See application file for complete search history.

(56) References Cited

U.S. PATENT DOCUMENTS

| | | | | | |
|---|---|---|---|---|---|
| 2,788,991 | A | * | 4/1957 | Neuhauser | 285/124.1 |
| 3,774,636 | A | * | 11/1973 | Arita | 137/615 |
| 4,460,156 | A | * | 7/1984 | Hazelrigg et al. | 285/325 |
| 4,611,831 | A | * | 9/1986 | Truchet | 285/317 |
| 4,738,463 | A | * | 4/1988 | Poore et al. | 280/420 |
| 5,829,337 | A | * | 11/1998 | Barden | 137/595 |
| 6,017,065 | A | | 1/2000 | Hellesoee | |
| 6,595,552 | B1 | * | 7/2003 | Mortari | 285/24 |
| 6,813,851 | B2 | * | 11/2004 | Mieger et al. | 37/417 |
| 7,464,967 | B2 | * | 12/2008 | Mieger et al. | 285/124.1 |

FOREIGN PATENT DOCUMENTS

| | | |
|---|---|---|
| FR | 2350496 | 12/1977 |
| JP | 61/014008 | 1/1986 |

* cited by examiner

*Primary Examiner* — David E Bochna
(74) *Attorney, Agent, or Firm* — Dowell & Dowell, PC

(57) ABSTRACT

An assembly and method for connecting a movable plate to a fixed plate for connecting hydraulic, pneumatic and/or electric circuits and wherein the movable plate and the fixed plate have matching connector elements. The movable plate includes at least one centering component capable of interacting with the fixed plate. The assembly includes an actuator having a fixed support, a movable component for moving the movable plate relative to the fixed support, between a first retracted position corresponding to a disconnected state of the plates and a second position corresponding to a connected state. The assembly also includes a device for moving the movable plate relative to the actuator, and the movable plate and the fixed support respectively have at least one positioning member and at lest one positioning component which interact to position the movable plate relative to the fixed support when the movable plate is in the first position.

10 Claims, 3 Drawing Sheets

CONNECTION ASSEMBLY AND METHOD OF CONNECTING SUCH AN ASSEMBLY

BACKGROUND OF THE INVENTION

1. Field of the Invention

The present invention relates to the field of connection of hydraulic, pneumatic and/or electric circuits by means of several matching connector elements mounted, on the one hand, on a plate called the mobile plate and, on the other hand, on a plate called the fixed plate. The present invention first of all relates to a connection assembly for such a movable plate to at least one such fixed plate. Moreover, the present invention relates to a method for connecting such a movable plate to at least one fixed plate.

2. Description of the Related Art

In order to connect together hydraulic, pneumatic and/or electric circuits, it is necessary to simultaneously and collinearly couple hydraulic, pneumatic and/or electric connector elements which are matching and which are mounted on two facing plates, namely a movable plate and an essentially fixed plate. Usually, the relative positioning of these two plates, before they are brought together, may have a centring defect, that is to say an offset in the plane of one of the plates, and a parallelism defect, that is to say an angular difference between the planes of these plates.

A connection assembly of the prior art usually which comprises a linear cylinder in order to move the movable plate towards the fixed plate in a direction of connection which is most frequently horizontal. To allow a fluttering of the movable plate approaching the fixed plate, and compensate for such positioning defects, the connection assembly also comprises a fluttering device. Such a fluttering device may, for example, comprise linear springs mounted between the movable plate and the cylinder rod.

In JP-A-61014008, the fluttering device 28 is inserted between the end of the cylinder rod 15, 18, 17 and a fluttering part 26 to which is connected the movable plate A by means of connector elements 4b/35.

The movable plate is like suspended by the fluttering device in an overhang or cantilever position at the end of the cylinder rod. In other words, this movable plate flutters or wobbles relative to the fixed support of the cylinder.

The movable plate and the fixed plate are equipped with at least one centring component and at least one centring member which have matching shapes. When the movable plate is moved towards the fixed plate, the centring component and the centring member interact or cooperate so as to position the movable plate relative to the fixed plate, which makes it possible to couple the matching connector elements collinearly. The centring component and the centring member guide the movable plate up to the fixed plate when they are connected. Usually, the centring component and the centring member consist respectively of a socket and a post.

However, after a connection of the plates, the position of the movable plate is adapted to the relative positioning defects of the plates. Consequently, after the cylinder has disconnected and moved the movable plate away from the fixed plate, the movable plate is retracted into a position which may be offset relative to an earlier retracted position corresponding to the mid-position of the amplitude of the fluttering. This offset, induced by each connection to a fixed plate and which the fluttering device does not manage to compensate for during the disconnection, makes a subsequent connection more difficult. The tolerance of the movable plate to the relative positioning defects of the plates is therefore reduced.

Furthermore, as the movable plate is suspended cantilever or overhanging by the fluttering device, the weight of the movable plate and of its components can change the position of the movable plate before a connection and therefore move it away from its theoretical middle or mid-position. Such a change in the position of the movable plate also reduces its tolerance to the relative positioning defects of the plates.

This is why a connection assembly of the prior art requires considerable clearances and relatively large guide surfaces between centring component(s) and centring member(s), in particular in the two dimensions of the plane of the movable plate and of the fixed plate. Such guide surfaces increase the bulk and weight of the centring components and members.

SUMMARY OF THE INVENTION

The main object of the present invention is to remedy these disadvantages, by proposing a connection assembly with a movable plate which have a high tolerance to the relative positioning defects and/or the guide components are less bulky.

Accordingly, the subject of the invention is a connection assembly for a movable plate to at least one fixed plate in order to connect hydraulic, pneumatic and/or electric circuits, said connection assembly comprising:
  a movable plate comprising:
    several connector elements capable of being coupled to matching connector elements mounted on the fixed plate;
    at least one centring component capable of interacting with the fixed plate in the connected state of the plates, so as to position the movable plate relative to the fixed plate;
  an actuator comprising:
    a fixed support;
    a movable component capable of moving, in a direction of connection, the movable plate relative to the fixed support between a first retracted position corresponding to a disconnected state of the movable plate relative to the fixed plate and a second position corresponding to a connected state of these plates;
    a fluttering device arranged between the movable component of the actuator and the movable plate, so as to allow, when the movable plate is between its first and second positions, at least one range of movement of the movable plate relative to the fixed support in rotation about and/or in translation along at least one axis perpendicular to the direction of connection;
  Besides, the movable plate also comprises at least one positioning member, the fixed support also comprises at least one positioning component and the or each positioning member is capable of interacting with the or each positioning component so as to position the movable plate relative to the fixed support while the movable plate is in the first position.

According to other advantageous but optional features of the invention, taken in isolation or in any technically acceptable combination:
  the or each centring component is designed to interact by matching shapes with a corresponding centring member placed on the fixed plate and the or each centring component is formed by a centring socket or by a centring post;
  the or each positioning member and the or each positioning component are capable of interacting by the matching of shapes, and the or each positioning member is formed by a positioning post or by a positioning socket, the or each positioning component being formed respectively by a positioning socket or by a positioning post;

at least one centring component is coaxial with a positioning member;

at least one centring component is made within a positioning member;

the or each positioning post and the or each positioning socket have a symmetry of revolution about an axis which is substantially parallel to the direction of connection, when the movable plate is in the first position;

the or each positioning socket and the or each positioning post comprise respectively a succession of conical surfaces and of cylindrical surfaces and these conical and cylindrical surfaces, respectively arranged on the positioning socket, on the one hand, and on the positioning post, on the other hand, are substantially matching with decreasing dimensions so as to allow the insertion with decreasing radial clearance of the or each positioning post into a corresponding positioning socket;

the conical surface, situated at the end, on the side of the fixed support, of the or each positioning member and the conical surface, situated at the end, on the side of the movable plate, of the or each positioning component have respective half-angles at the apex of between 20° and 40°, preferably between 27° and 33°;

the fluttering device comprises at least one elastic component which is placed between the movable plate and the movable component and which consists of a stack of elastic washers or of a linear spring working in compression; and the or each positioning component is arranged on the fixed support so that the or each positioning member is found in a middle position in the amplitude of the range of movement allowed by the fluttering device, when the movable component positions the movable plate in the first, disconnected and retracted position.

A further subject of the present invention is a method for connecting a movable plate to at least one fixed plate, in order to connect hydraulic, pneumatic and/or electric circuits, the said movable plate belonging to the said connection assembly and comprising:

several connector elements;

at least one centring component;

at least one positioning member;

the said fixed plate comprising:

several connector elements capable of being coupled to the connector elements of the movable plate;

at least one centring member capable of interacting with the centring component in the connected state of the plates;

the said connection assembly also comprising an actuator which comprises:

a fixed support;

a movable component capable of moving, in a direction of connection, the movable plate relative to the fixed support between a first retracted position corresponding to a disconnected state of the movable plate relative to the fixed plate and a second position corresponding to a connected state of these plates;

a fluttering device arranged between the movable component and the movable plate, so as to allow at least one range of movement of the movable plate relative to the fixed support in rotation about and/or in translation along at least one axis perpendicular to the direction of connection;

This connection method also comprises the steps consisting in:

b) bringing into engagement at least one positioning member supported by the movable plate with a corresponding positioning component supported by the fixed support so as to position the movable plate relative to the fixed support while the movable plate is in the first position;

c) controlling the actuator in order to move the movable plate towards the fixed plate in a direction of connection;

d) bringing into engagement the or each centring member with the corresponding centring component, so as to position the movable plate relative to the fixed plate;

e) coupling the respective connector elements of the movable plate and the fixed plate.

According to other advantageous but optional features of this method, it comprises a prior step consisting in placing the connection assembly in an initial position determined so that the maximum distance, in the direction of connection between, on the one hand, an end of a centring member of the fixed plate, which is designed to come into engagement with a centring component, and, on the other hand, an end of the corresponding positioning component of the fixed support, which is designed to come into engagement with a positioning member, is less than the maximum distance between, on the one hand, an end of the centring component of the movable plate, which is designed to come into engagement with the centring member, and, on the other hand, an end of the corresponding positioning member of the movable plate, which is designed to come into engagement with the positioning component.

BRIEF DESCRIPTION OF THE DRAWINGS

The invention will be well understood and other advantages of the latter will also emerge in the light of the following description, given only as a non-limiting example and made with reference to the appended drawings in which.

DESCRIPTION OF THE PREFERRED EMBODIMENTS

FIGS. 1 to 4 illustrate a connection assembly 1 comprising a plate 2 called a movable plate and an actuator 4, for connecting the movable plate 2 to a plate 3 called a fixed plate. The movable plate 2 and the fixed plate 3 have shapes that are respectively essentially flat and rectangular. The movable plate 2 extends mainly in a plane $X_2$-$Y_2$ and the fixed plate 3 extends mainly in a plane $X_3$-$Y_3$, these planes being vertical.

Figures 1, 2:
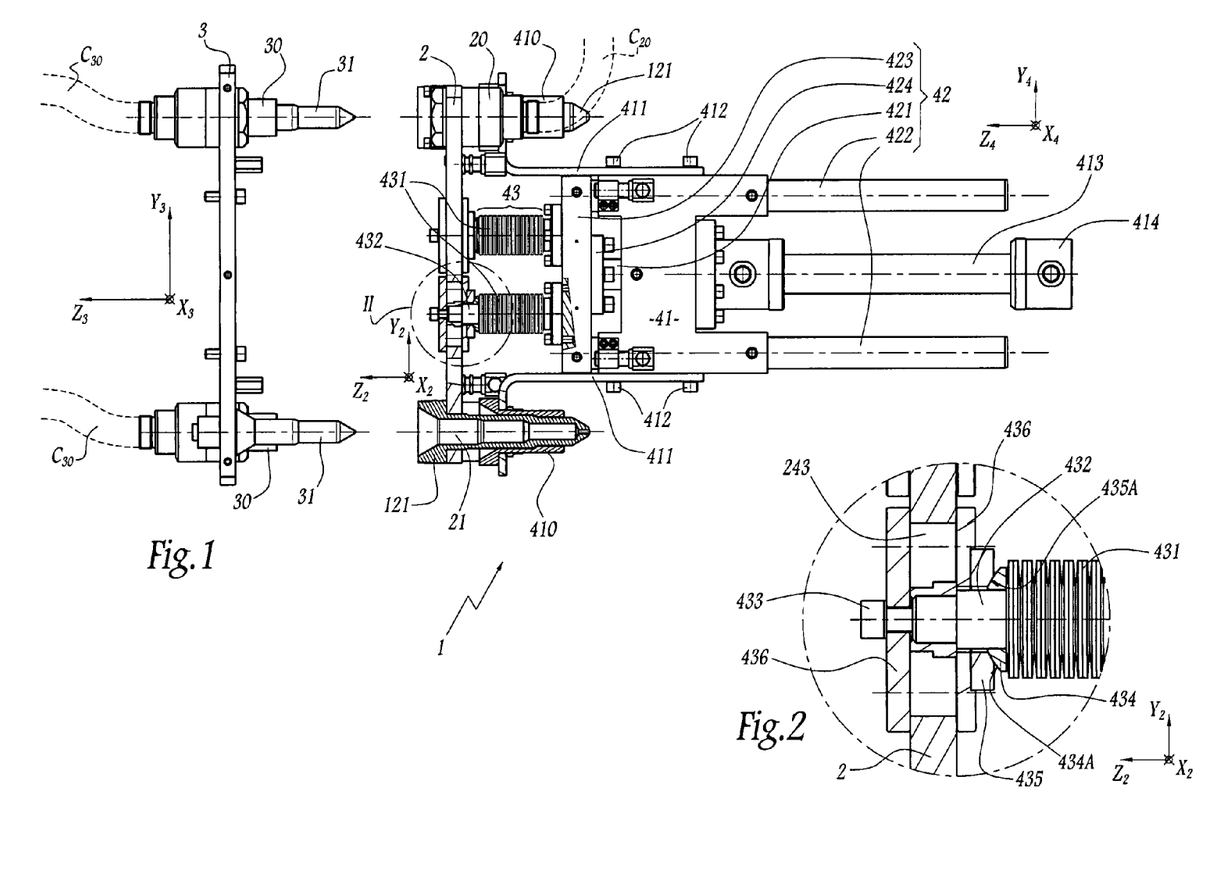
FIG. 1 is a view from the side and in partial section of a connection assembly according to the invention in the disconnected state of a movable plate according to the invention and of a fixed plate, the movable plate being in a first position retracted relative to the connection assembly.
FIG. 2 is a view on a larger scale of the detail II of FIG. 1.

In the configuration of FIG. 1, the movable plate 2 and the fixed plate 3 are in the disconnected state and the actuator 4 supports the movable plate 2 in a retracted position, in which an axis $Z_2$ of the movable plate 2 is parallel to an axis $Z_4$ of the actuator 4. In this first retracted position of the movable plate 2, the plane $X_2$-$Y_2$ associated with the movable plate 2 is parallel to a plane $X_4$-$Y_4$ associated with the actuator 4, but it is approximately parallel and may have a defect of parallelism relative to the plane $X_3$-$Y_3$ associated with the fixed plate 3 as is explained below.

Figures 3, 4:
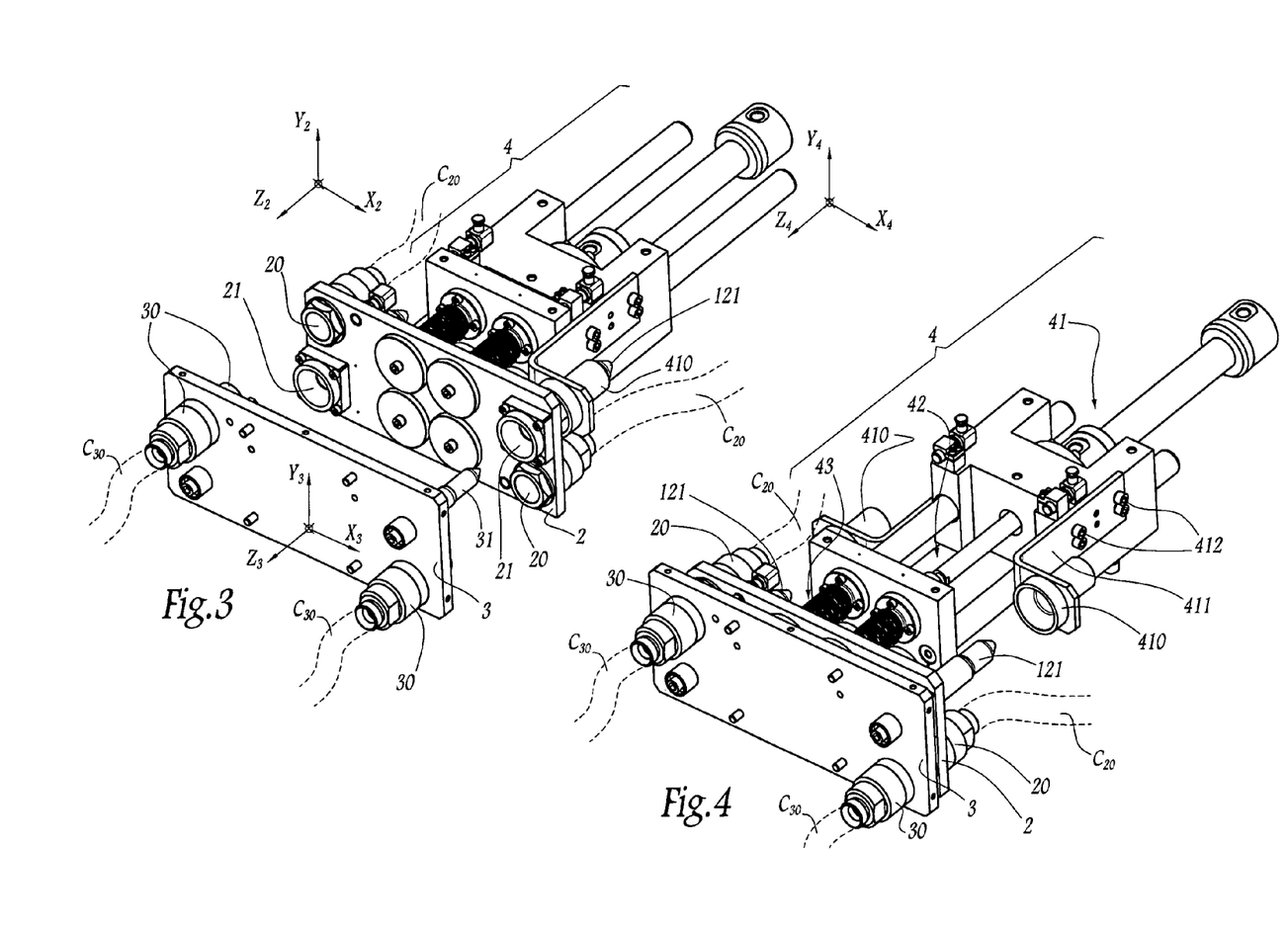
FIG. 3 is a view in perspective of the connection assembly of FIG. 1.
FIG. 4 is a view in perspective of the connection assembly of FIG. 1 in the state in which the movable plate is connected to the fixed plate, the movable plate being in a second position.

The movable plate 2 comprises connector elements, some of which can be seen in FIGS. 1, 3 and 4 with reference number 20. The fixed plate 3 also comprises connector elements, some of which can be seen in FIGS. 1, 3 and 4 with reference number 30, which have shapes matching the connector elements 20 of the movable plate 2. Therefore, the connector elements 20 are capable of being coupled to the connector elements 30, so as to connect flexible hydraulic, pneumatic or electric circuits $C_{20}$ and $C_{30}$ respectively to the connector elements 20 and 30.

The movable plate 2 and the fixed plate 3 may comprise other matching connector elements that are not shown, in order to connect other hydraulic, pneumatic and/or electric circuits. When the movable plate 2 is connected to the fixed plate 3, the hydraulic, pneumatic or electric flows may circulate via connector elements such as 20 and 30.

The actuator 4 comprises a fixed support 41, a movable component 42 that can be moved by a linear cylinder and a wobbling or fluttering device 43. In the example of FIG. 1, the fixed support 41 comprises a cylinder casing of parallelepipedal shape and an arm 413 which serves as a housing for the retracted cylinder rod. The fixed support 41 is mounted on a transport device or a support that is not shown.

Figure 8:
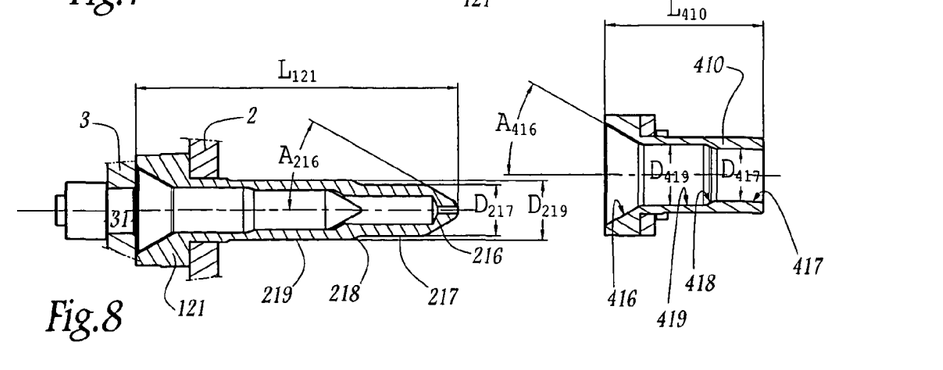
FIG. 8 is a view similar to FIG. 5 in the state in which the movable plate is connected to the fixed plate.

As the comparison between FIGS. 3 and 4 shows, the movable component 42 is suitable for moving, on the axis $Z_4$, the movable plate 2 relative to the fixed support 41 and up to the fixed plate 3 so that the plate 2 reaches a second position represented in FIGS. 4 and 8 where the plates 2 and 3 are connected. For this, the movable component 42 consists of a cylinder rod 421, two guide rods 422 and a carriage 423 on which a portion of the fluttering device 43 is mounted. The cylinder rod 421 can be moved along axis $Z_4$ which corresponds substantially to the direction of connection of the movable plate 2 onto the fixed plate 3. The cylinder rod 421 is connected, on the one hand, to the fixed support 41 and, on the other hand, to the carriage 423 via a flange 424.

The fluttering device 43 comprises four elastic components 431 two of which can be seen in FIG. 1 and under which are situated respectively the other two elastic components. Each elastic component 431 consists in this instance of a stack of flexible Belleville washers mounted prestressed about a respective shaft 432. As shown in FIG. 2, the shafts 432 are attached to the carriage 423. Two abutment rings 436 are mounted on each shaft 432 and are traversed by a corresponding fixing screw 433 so as to encase the movable plate 2. An annular space 243 is arranged radially between the movable plate 2 and each shaft 432. The fixing screws 433 and the abutment rings 436 form means for connecting the movable plate 2 to the fluttering device 43.

Mounted about each shaft 432, between the movable plate 2 and the elastic component 431, is a ring 434 having a convex spherical face 434A and a ring 435 having a concave spherical face 435A. The convex face 434A and the concave face 435A are kept pressed against one another by the elastic component 431, thereby defining a swivel joint articulating the movable plate 2 relative to the movable component 42.

Therefore, the fluttering device 43 connects the movable component 42 to the movable plate 2 via connection means described above which allow at least one displacement or range of movement of the movable plate 2 relative to the fixed support 41 of the actuator 4. The movable plate 2 is therefore suspended cantilevered or overhanging at the end of the actuator 4. The movable plate 2 therefore has angular and linear ranges of movement relative to the axes $X_4$ and $Y_4$ which are connected to the actuator 4 and which are perpendicular to the direction of connection $Z_4$.

In other words, the fluttering device 43 is arranged between the movable component 42 and the movable plate 2, so as to allow at least displacement one range of movement of the movable plate 2 relative to the fixed support 41 in rotation about and/or in translation along the axes $X_4$ and $Y_4$. "Range of movement" means the amplitude of movement of the movable plate relative to the retracted position, which it exhibits in the disconnected state of the fixed plate 3 and the movable plate 2. By extension, the movable plate 2 also has a range of movement relative to the fixed plate 3.

To guide the movable plate 2 towards the fixed plate 3 when they are connected, the movable plate 2 also comprises two centring components which are capable of interacting with two centring members of matching shapes of the fixed plate 3. In the example of the figures, the centring components consist of centring sockets 21, while the centring members consist of centring posts 31.

The centring sockets 21 are mounted at two diagonally opposed corners of the movable plate 2. The centring posts 31 occupy corresponding positions on the fixed plate 3 and they are therefore in this instance mounted at two diagonally opposed corners of the fixed plate 3, to the extent that the fixed plate 3 and the movable plate 2 have similar dimensions. The centring sockets 21 and the centring posts 31 make it possible to position the movable plate 2 relative to the fixed plate 3 as is described below.

Figure 5:
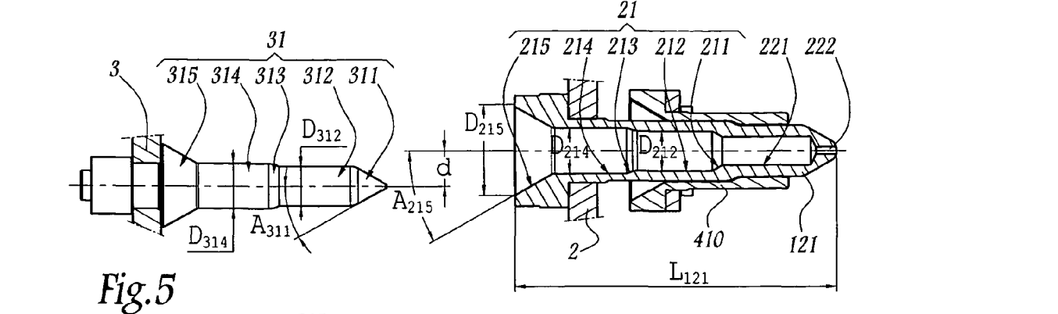
FIG. 5 is a view in partial section and on a larger scale of a portion of the connection assembly of FIG. 1 and of a portion of the fixed plate of FIG. 1.

As is shown in greater detail in FIG. 5, the centring socket 21 comprises a succession of conical internal surfaces which are connected in twos by cylindrical internal surfaces. The conical internal surfaces and the cylindrical internal surfaces are coaxial and, in the example, have a circular base.

Each centring socket 21 therefore comprises a frustoconical mouth 215, followed by a first cylindrical surface 214 then by a first frustoconical reduction 213, by a second cylindrical surface 212 and a second frustoconical reduction 211. The frustoconical reduction 211 opens into a cylindrical chamber 221 which is extended by a channel 222. The cylindrical chamber 221 and the channel 222 make it possible to discharge the air in front of the centring post, thereby preventing the presence of compressed air capable of resisting the connection.

In a matching manner, the external surface of each centring post 31 comprises a frustoconical collar 315, followed by a first cylindrical portion 314, then by a frustoconical reduction 313 itself followed by a second cylindrical portion 312. Each centring post 31 terminates in a conical point 311. Each centring socket 21 therefore has a symmetry of revolution about an axis parallel to the axis $Z_2$, while each centring post 31 has a symmetry of revolution about an axis parallel to the axis $Z_3$.

To the extent that the dimensions, lengths, diameters and half-angles at the apex or conicity, corresponding conical and cylindrical surfaces of each centring post 31 and of each centring socket 21 are substantially equivalent, the centring post 31 and the centring socket 21 have shapes that are generally substantially matching, which allows them to be interlinked with a decreasing radial clearance when the movable plate 2 is moved closer to the fixed plate 3 by means of the actuator 4. Therefore, the collar 315 and the mouth 215 have matching geometries, like the cylindrical portion 314 and the cylindrical surface 214, the frustoconical reduction 313 and the frustoconical reduction 213, the cylindrical portion 312 and the cylindrical surface 212, and the conical point 311 and the second frustoconical reduction 211. Each centring socket 21 is therefore capable of interacting by matching shapes with the corresponding centring post 31.

In the connected state of the movable plate 2 to the fixed plate 3, as illustrated in FIG. 8, when the axis $Z_2$ is parallel to the axis $Z_3$, these matching surfaces are respectively facing one another with a radial clearance that is reduced and determined so as to prevent binding between each centring post 31 and each centring socket 21. In other words, the diameter $D_{314}$ of the cylindrical portion 314 is slightly smaller than the diameter $D_{214}$ of the cylindrical surface 214, similarly the diameter $D_{312}$ of the cylindrical portion 312 is slightly smaller than the diameter $D_{212}$ of the cylindrical surface 212.

Moreover, the movable plate 2 also comprises two positioning members and the fixed support 41 also comprises two positioning members. Each positioning member is capable of cooperating or interacting with a corresponding positioning component so as to position the movable plate 2 relative to the fixed support 41. For this purpose, the positioning members and the positioning components have matching shapes, like the centring posts 31 and the centring sockets 21.

In the example of the figures, each positioning member supported by the movable plate 2 is formed by a positioning post 121 and each centring component supported by the movable plate 2 is formed by a centring socket 21. In addition, each centring socket 21 is made within a positioning post 121, which contributes to the compactness of the connection assembly 1. Therefore, each positioning post 121 has a recess which defines a respective centring socket 21.

Each centring socket 21 and the associated positioning post 121 therefore form two portions 21 and 121 of one and the same part, each of these portions 21 and 121 fulfilling a specific guidance function. This common part, which may be qualified as a "socket-post" has an internal surface serving as a centring socket 21 and an external surface serving as a positioning post 121.

The positioning posts 121 are situated at two diagonally opposed corners of the movable plate 2, like the associated centring sockets 21. Each positioning component mounted on the fixed support 41 is formed by a positioning socket 410 which is capable of cooperating or interacting by matching shapes with a respective positioning post 121.

Each positioning socket 410 is secured to a bracket-shaped support 411, which is secured to the fixed support 41 by screws 412. Each positioning socket 410 occupies, on the fixed support 41, a position such that the associated positioning post 121 is in the middle fluttering position, when this positioning socket 410 and this positioning post 121 interact in the retracted position of the movable plate 2.

Each positioning socket 410 and each positioning post 121 comprise respectively a succession of conical surfaces connected in twos by cylindrical surfaces. As in the case of the centring post 31 and of the centring socket 21, the respective conical and cylindrical surfaces of each positioning socket 410 and of each positioning post 121 have successive matching diameters which define a stepping or a terracing decreasing in the direction of connection that is represented by the axis $Z_4$. Such a stepping allows each positioning post 121 to be inserted into a respective positioning socket 410, with a decreasing radial clearance.

As shown in FIG. 8, a positioning post 121 comprises a first external cylindrical portion 219 with a diameter $D_{219}$ followed by an external frustoconical reduction 218, a second external cylindrical portion 217 with a diameter $D_{217}$ and an external conical point 216. Each positioning socket 410 comprises, in a matching manner, a frustoconical mouth 416, followed by a first internal cylindrical surface 419 with a diameter $D_{419}$, an internal frustoconical reduction 418 and a second internal cylindrical surface 417 that opens out and has a diameter $D_{417}$. Each positioning post 121 has a symmetry of revolution about an axis parallel to the axis $Z_2$, while each positioning socket 410 has a symmetry of revolution about an axis parallel to the axis $Z_3$.

The dimensions, lengths, diameters and half-angles at the apex or conicity, of the guide surfaces of each positioning post 121 and of each positioning socket 410 are substantially equivalent. To prevent any binding, a radial mounting clearance is provided between the external surface of the positioning post 121 and the internal surface of the positioning socket 410.

As is shown in FIG. 5, during the connection phase of the movable plate to the fixed plate and when a centring socket 21 and a centring post 31 begin to interact, the centring socket 21 is in the middle fluttering position, give or take the radial clearances on the axes $X_2$ and $Y_2$, because each positioning post 121 is guided into the corresponding positioning socket 410. This middle position or "mid-position" is defined as the position corresponding to the mid-point of the displacement or range of movement that the fluttering device 43 allows the movable plate 2 relative to the fixed support 41. By extension, "mid-position" is used for components of the movable plate 2, such as a positioning post 121.

At the beginning of this interaction between the centring socket 21 and the centring post 31, an offset d exists in the plane $X_2$-$Y_2$ between the end of the centring post 31 and the axis of the centring socket 21. A defect of parallelism not shown may also exist between the axis of the centring post 31 and the axis of the centring socket 21. The offset d and the defect of parallelism are compatible with the range of movement allowed by the fluttering device 43. In addition, the maximum diameter $D_{215}$ of the frustoconical mouth 215 is dimensioned notably according to the offset d.

Moreover, the half-angles at the apex of the conical surfaces of the centring sockets 21 are matched to the half-angles at the apex of the conical surfaces of the corresponding centring posts 31. In particular, the half-angle at the apex $A_{215}$ that a generatrix of the frustoconical mouth 215 forms with the axis of the centring socket 21 is between 20° and 40°, preferably between 27° and 33°, and corresponds substantially to the half-angle at the apex $A_{315}$ that a generatrix of the conical collar 315 forms with the axis of a centring post 31.

Similarly, the half-angle at the apex $A_{211}$ that a generatrix of the second frustoconical reduction 211 forms with the axis of the centring socket 21 is between 20° and 40°, preferably between 27° and 33°, and corresponds substantially to the half-angle at the apex $A_{311}$ that a generatrix of the conical point 311 forms with the axis of a centring post 31.

For the same purpose of making it easier to engage the corresponding members and components, the half-angle at the apex $A_{216}$ of the conical point 216 of a positioning post 121 and the half-angle at the apex $A_{416}$ of the frustoconical mouth 416 of a positioning socket 410 are equivalent and are between 20° and 40°, preferably between 27° and 33°. Similarly, the half-angle at the apex $A_{218}$ of the external frustoconical reduction 218 matches the half-angle at the apex $A_{418}$ of the internal frustoconical reduction 418. Such conicities make it possible to prevent any binding when the corresponding guide components are interlinked or separated while restricting the force to be applied by the actuator on the axis $Z_4$ in order to cause the range of movement of the movable plate 2 with its guide components.

According to a variant not shown, each centring component of the 21 type may be dissociated from each positioning member of the 121 type mounted on the fixed plate. In this case, each centring component of the 21 type forms a part that is independent and different from each positioning member of the 121 type. The production of a single part, a "socket-post", forming simultaneously the centring component 21 and the positioning member 121 however makes it possible to reduce the bulk of the components for guiding the movable plate in the plane $X_2$-$Y_2$ and on the axis $Z_2$.

According to another variant not shown, the stack of Belleville washers may be replaced by a linear spring working in compression or by any equivalent elastic component.

According to other variants not shown, a connection assembly according to the invention may comprise a single positioning component and a single positioning member, or more than two positioning components and more than two associated positioning members.

Moreover, these positioning component(s) and member(s) may be mounted in various locations on the movable plate, namely in its central region or in its peripheral region. In addition, the fluttering device may provide the movable plate with a greater range of movement relative to, that is to say about and/or on one axis, for example $X_4$, than relative to the other axis, for example $Y_4$.

According to another variant not shown, it is possible to invert the mounting of the guide components; therefore, the movable plate may comprise a positioning socket and a centring post, optionally in the form of a socket-post, while the fixed support comprises a positioning post and the fixed plate comprises a centring socket.

According to another variant not shown, the movable plate comprises a positioning socket and a centring socket, while the fixed support comprises a positioning post and the fixed plate comprises a centring post.

According to another variant not shown, each respective internal or external surface of the guide components, such as the centring sockets, centring posts, positioning sockets and positioning posts, is in the form of a prism, the axis of which is substantially parallel to the direction of engagement of these components and the base of which is adapted to allow the cooperation or interaction of these surfaces with one another. Such a prism may for example have a hexagonal base.

The method that is the subject of the invention for the connection of the movable plate 2 to the fixed plate 3 will now be described below, with reference notably to FIGS. 3 to 8.

In order to connect the movable plate 2 to the fixed plate 3, a transport carriage, not shown, on which the actuator 4 is mounted, brings the movable plate 2 to face the fixed plate 3. During a prior step of the connection method that is the subject of the invention, the transport carriage, which can move on the axes $X_4$, $Y_4$ and $Z_4$, places the connection assembly 1 with the movable plate 2 in an initial position (FIGS. 1, 3 and 5) relative to the fixed plate 3, determined so that the maximum distance $Z_{21}$, taken parallel to the direction $Z_4$, between the conical point 311, which forms the engagement end of a centring post 31 with the associated positioning socket, and the conical mouth 416, which forms the engagement end of the corresponding positioning socket 410 with the associated positioning post, is less than the length $L_{121}$ of the positioning post 121.

More precisely, the maximum distance $Z_{21}$ must be less than the length $L_{121}$ corresponding to the maximum distance, taken parallel to the axis $Z_2$, between the engagement end of the centring socket 21 of the movable post 2 with the fixed plate 3, in this instance the conical mouth 215, and the engagement end of the positioning post 121 of the movable plate 2 with the fixed support 41, in this instance the conical point 216.

This gives the continuity of guidance of the movable plate, so that each centring post 31 begins to fit into the corresponding centring socket 21, while each positioning post 121 leaves the corresponding positioning socket 410. Prior to this, the carriage places the movable plate 2 in a position in which its relative positioning defect relative to the fixed plate 3 is compatible with the range of movement allowed by the fluttering device 43.

In the disconnected state, and in the retracted position, the movable plate 2 can have a relative positioning defect relative to the fixed plate 3, that is to say a centring defect in the plane $X_2$-$Y_2$ and an angular difference between the planes $X_2$-$Y_2$ and $X_3$-$Y_3$.

Then, the actuator 4 is controlled so that the cylinder rod 421 moves the movable plate 2 towards the fixed plate 3 on the axis $Z_4$. At the beginning of this translation of the movable plate 2, each positioning post 121 is guided into a matching positioning socket 410, in the mid-position, by the interaction of the second external cylindrical portion 217 with the second internal cylindrical surface 417.

If the cylinder rod 421 is not in the retracted position, but on the contrary in the extended position, a step prior to the translation of the movable plate 2 towards the fixed plate 3 may consist in retracting the movable plate 2, that is to say in engaging each positioning post 121 in each positioning socket 410 until there is contact between the external frustoconical reduction 218 and the internal frustoconical reduction 418, so as to position the movable plate 2 with reduced radial clearance relative to the fixed support 41 in the middle fluttering position. The movable plate 2 can then be in the connected state or in the disconnected state relative to the fixed plate 3 and, when it is in the disconnected state, the movable plate 2 can be placed in a retracted position or in an extended position.

The range of movement of the movable plate 2 allowed by the fluttering device 43 relative to the fixed support 41 makes it possible to compensate, on the one hand, for the offset d existing between the end of each centring post 31 and the axis of each centring socket 21 at the beginning of their engagement and, on the other hand, for the angular defect between the planes $X_2$-$Y_2$ and $X_3$-$Y_3$, which is not shown in the figures.

When the second external cylindrical portion 217 interacts between the first internal cylindrical surface 419, the fluttering device 43 makes possible a beginning of range of movement of the movable plate 2, so that the centring socket 21 is already "fluttering" when it docks with the centring post 31.

Figure 6:
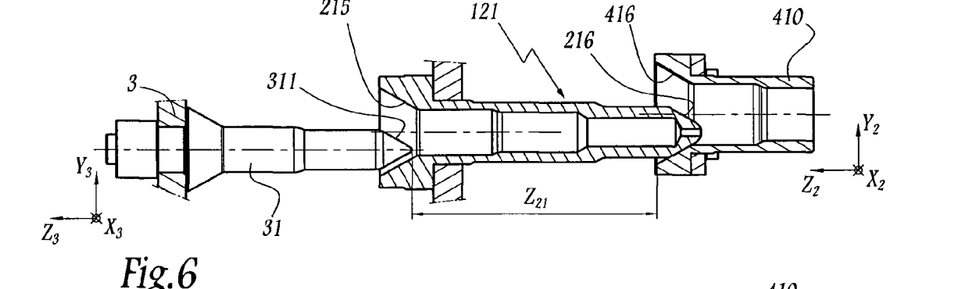
FIGS. 6 and 7 are views similar to FIG. 5, during the connection of the movable plate to the fixed plate.
Figure 7:
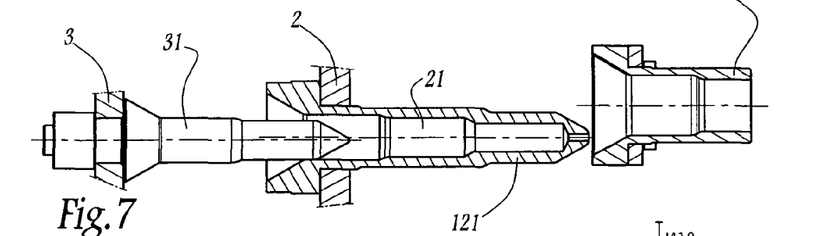

When the cylinder rod 421 continues the translation of the movable plate 2 towards the fixed plate 3, the movable plate 2 adapts its position so that each centring socket 21 engages about the corresponding centring post 31, with a radial clearance that decreases gradually as they are guided mutually, as shown in FIGS. 6 and 7.

When each positioning post 121 leaves the corresponding positioning socket 410, that is to say when the conical point 216 leaves the frustoconical mouth 416, each centring post 31 of the fixed plate 3 begins to engage in the associated centring socket 21 of the movable plate 2. The conical point 311 is guided by the frustoconical mouth 215 as shown in FIG. 6.

As shown in FIG. 8, when the movable plate 2 butts against the fixed plate 3, the respective cylindrical and conical surfaces, more particularly the surfaces 214, 212 and 314, 312, of these guide components are facing one another. The movable plate 2 and the fixed plate 3 are then in the connected state, in which the position of the movable plate 2 is adapted to the relative positioning defects and in which the respective connector elements 20 and 30 of the movable plate 2 and of the fixed plate 3 are connected together, so as to connect the hydraulic, pneumatic and/or electric circuits $C_{20}$ and $C_{30}$. Detectors not shown can indicate the completion of the connection between plates, thereby indicating that the connection is effective. In the connected state, each centring post 31 of the fixed plate 3 interacts with the corresponding centring socket 21 in a relatively precise adjustment which exhibits a radial clearance of the order of 0.5 mm.

When the movable plate 2 is in the retracted position, the radial clearance between the conical or cylindrical surfaces 216 to 219 of each positioning post 121 and the matching cylindrical or conical surfaces 416 to 419 of each corresponding positioning socket 410 may be about 1 mm because the precision required in the disconnected state is inferior.

The variants of the invention described above provide the benefits mentioned below.

First of all, the connection assembly allows relatively high tolerances with respect to relative positioning defects, centring and parallelism, between the movable plate and the fixed plate.

In addition, the guide components of a connection assembly according to the invention represent a relatively small bulk, notably in the plane of the movable plate, in particular if the movable plate comprises "socket-posts". Consequently, such a connection assembly can tolerate greater positioning defects for the same bulk in the plane of the movable plate.

Moreover, when the movable plate is placed in the retracted position by the movable component of the actuator, that is to say when the rod is retracted into the casing of the cylinder, the interaction between positioning component and member limits, and even prevents, the fluttering of the movable plate. After each connection, the retraction of the movable plate in the mid-position makes it possible to retain the same relative positioning tolerances that are acceptable between the movable plate and the fixed plate for the purpose of a subsequent connection, for an identical dimensioning of the guide components. In addition, the interaction of the fixed support and the movable plate in the retracted position ensures a precise return to the mid-position.

In addition, the vibrations of the movable plate are reduced relative to the connection assemblies of the prior art, which reduces the risks of damage to the movable plate and of changing its position when the transport carriage moves the connection assembly. By contrast, a connection assembly of the prior art does not prevent the displacement of the movable plate relative to the fixed support in the retracted position, so that this movable plate can leave its mid-position even when it is in the retracted position.

The stepping of the guide components, in particular of the "socket-posts", ensures a radial mounting clearance that decreases gradually as the guide components are engaged, which prevents binding between the guide components. In addition, this stepping makes it possible to make, on the one hand, each centring component and each centring member and on the other hand, each positioning component and each positioning member momentarily interact simultaneously. This provides a guidance that is continuous and without binding of the movable plate between the fixed support and the fixed plate.

Moreover, the or each positioning component of the movable plate, which ensures the centring of the movable plate relative to the actuator, is substantially coaxial to the or each centring member of the movable plate, which limits the bulk of the movable plate.

During the disconnection of the movable plate 2 and the fixed plate 3, the cylinder rod 421 retracts the movable plate 2 with the fluttering device 43. At the beginning of this movement, each centring post 31 precisely guides the corresponding centring socket 21, which makes it possible to decouple the connector elements 20 and 30 in a collinear manner and without causing the latter to undergo excessive stresses.

After the decoupling of the connector elements 20 and 30, the radial clearance on the plane $X_2$-$Y_2$ increases between each centring post 31 and each corresponding centring socket 21 during the cooperation of the surfaces 312 and 214, which makes possible a beginning of range of movement of the movable plate 2 by the fluttering device 43. Then, when each centring post 31 leaves the conical mouth 215 of the corresponding centring socket 21, the conical point 216 of each positioning post 121 is in contact with each corresponding positioning socket 410, because the maximum distance $Z_{21}$ is less than the length $L_{121}$ of the socket-post 21-121. Therefore, there is also a continuity of guidance between the guide components during the disconnection of the movable plate 2 and the fixed plate 3.

Each positioning socket 410 finally guides the range of movement of the corresponding positioning post 121, with a radial clearance that decreases gradually with the interaction of the surfaces 217 and 419, then 217 and 417 and 219 and 419, until the disconnected and retracted state of the movable plate 2 from the fixed plate 3. In this retracted position, the movable plate 2 is returned to the mid-position. The connection assembly 1 is then available for a new connection of its movable plate 2 to a fixed plate.

Any technically acceptable combination of the technical features specified above constitutes an additional variant of the invention.

The invention claimed is:

1. A connection assembly for connecting a movable plate to at least one fixed plate in order to connect hydraulic, pneumatic and/or electric circuits, the connection assembly comprising:
    a movable plate including:
        first connector elements capable of being coupled to matching second connector elements mounted on the fixed plate;
        at least one centering component interacting with the fixed plate in the connected state of the plates, so as to position the movable plate relative to the fixed plate;
    an actuator including:
    a fixed support; and
    a movable component for moving, in a direction of connection ($Z_4$), the movable plate relative to the fixed support between a first retracted position corresponding to a disconnected state of the movable plate relative to the fixed plate and a second position corresponding to a connected state of these plates;
    a fluttering device arranged between the movable component of the actuator and the movable plate, so as to allow, when the movable plate is between its first and second positions, at least one range of movement of the movable plate relative to the fixed support in rotation about and/or in translation along at least one axis ($X_4$, $Y_4$) perpendicular to the direction of connection ($Z_4$);
    wherein the movable plate also includes at least one positioning member, the fixed support also including at least one positioning component for interacting with the at least one positioning member so as to position the movable plate relative to the fixed support while the movable plate is in the first position, and wherein, when the movable plate is in the second position, the at least one positioning member of the movable plate is spaced from and does not interact with the at least one positioning component of the fixed support.

2. The connection assembly of claim 1, wherein the at least one centering component is configured to interact, by matching shapes, with a corresponding centering member placed on the fixed plate and wherein the at least one centering component is formed by one of a centering socket and a centering post.

3. The connection assembly of claim 2, wherein at least one centering component is coaxial with the at least one positioning member.

4. The connection assembly of claim 3, wherein at least one centering component is provided within the at least one positioning member.

5. The connection assembly of claim 1, wherein the at least one positioning member and the at least one positioning component cooperatively interact by engaging one within the other and wherein the at least one positioning member is formed by one of a positioning post and a positioning socket and the at least one positioning component is formed by the other of the positioning socket and the positioning post.

6. The connection assembly of claim 5, wherein the positioning post and the positioning socket have a symmetry of revolution about an axis, when the movable plate is in the first position.

7. The connection assembly of claim 6, wherein each positioning socket and each positioning post include, respectively, a succession of conical surfaces and cylindrical surfaces, and these conical and cylindrical surfaces, respectively arranged on the positioning socket and on the positioning post are substantially matching with decreasing dimensions so as to allow the insertion with decreasing radial clearance of each positioning post into a corresponding positioning socket.

8. The connection assembly of claim 7, wherein the conical surface, situated at the end, on the side of the fixed support, of each positioning member and the conical surface, situated at the end, on the side of the movable plate, of each positioning component have respective half-angles at the apex of between 20° and 40°.

9. The connection assembly of claim 1, wherein the fluttering device includes at least one elastic component which is placed between the movable plate and the movable component and which consists of one of a stack of elastic washers and a linear spring working in compression.

10. The connection assembly of claim 1, wherein each positioning component is arranged on the fixed support so that each positioning member is found in a middle position in a range of movement allowed by the fluttering device, when the movable component positions the movable plate in the first, disconnected and retracted position.

* * * * *